United States Patent [19]
Barnes

[11] 3,736,890
[45] June 5, 1973

[54] METER

[76] Inventor: Edward Barnes, 7, Dene Way, Speldhurst, England

[22] Filed: Sept. 16, 1971

[21] Appl. No.: 181,032

Related U.S. Application Data

[63] Continuation of Ser. No. 822,791, April 2, 1969, abandoned.

[52] U.S. Cl. ................................................111/7
[51] Int. Cl. ............................................A01c 23/02
[58] Field of Search ..........................111/1, 6–7; 47/1.43

[56]   References Cited
UNITED STATES PATENTS 2,808,786   10/1957   Johnston .............................. 111/7 X
3,012,526   12/1961   Baldwin et al. ......................... 111/6
3,330,070   7/1967    Fem et al. ........................... 47/1.43 X
3,331,340   7/1967    Tschudy ............................... 111/6

Primary Examiner—Robert E. Bagwill
Attorney—Brooks, Haidt & Haffner

[57]   ABSTRACT

A device for delivering anhydrous ammonia to the soil so as to provide substantially uniform treatment of the soil which comprises a conduit or delivery pipe connected to a supply of anhydrous liquid ammonia through a valve which is opened for a set pre-determined period of time by a time switch. Means are provided for actuating the time switch at times spaced in proportion to the rate of movement of the apparatus over the soil.

5 Claims, 1 Drawing Figure

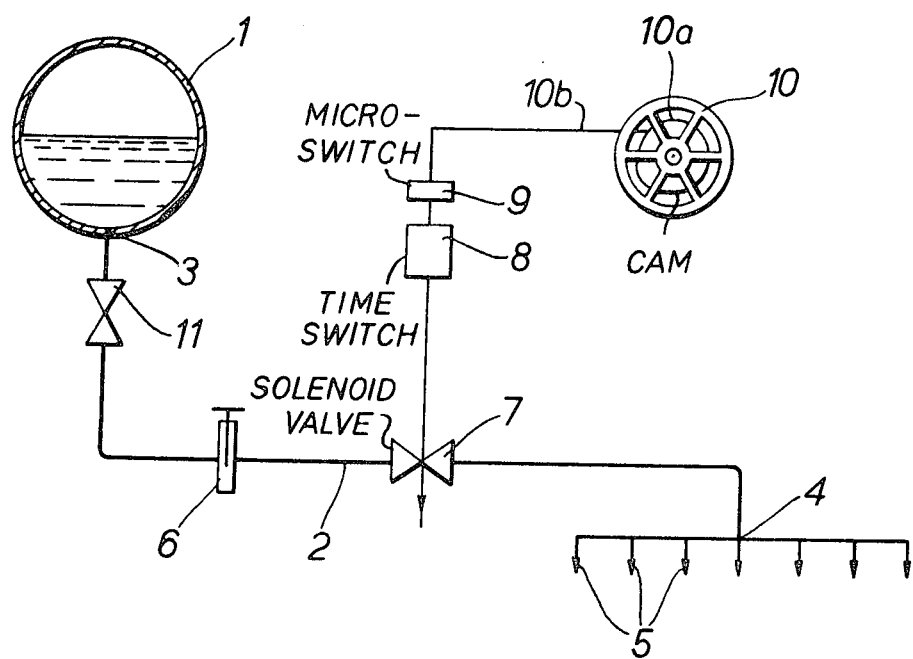

METER

This application is a continuation of my co-pending application Ser. No. 822,791, filed Apr. 2, 1969 (and now abandoned) and entitled "Meter."

BACKGROUND OF THE INVENTION

In the fertilization of land with anhydrous liquid ammonia, ammonia has to be injected into the soil at a pre-determined rate. This may be achieved by means of a positive displacement pump operated by a land wheel drive. The disadvantages associated with fluid metering devices employing such pumps are their sensitivity to dirt, their many moving parts involving maintenance problems, and inaccuracies due to slip of land wheel.

An alternative method of applying anhydrous liquid ammonia to the soil involves the use of an orifice meter which unlike the above method controls the flow in respect of time rather than distance, i.e., a pre-determined constant rate of flow is set. This system is dependent on a uniform speed of application and variations in the speed of the applicator vehicle which always occurred in practice lead to inaccuracies in the rate at which ammonia is applied. A further objection to these meters is that they do not automatically close when the device supplying the ammonia stops, giving rise to a safety hazard and less serious, but still important, the possibility of scorching vegetation if the flow continues when the ammonia application device ceases to move over the soil.

BRIEF STATEMENT OF THE INVENTION

According to the invention in ammonia injection apparatus having a delivery pipe for injecting ammonia into the soil as the apparatus is moved over the soil and having supply tanks supplying the ammonia there is provided in combination therewith a valve connected between said tank and said delivery pipe for controlling the flow of ammonia from said tank to said pipe, a time switch for controlling the opening and closing of said valve, said switch, when activated, opening said valve for a set, pre-determined period of time and then closing said valve at the end of set period, thereby permitting a fixed pre-determined quantity of ammonia to flow from said tank to said pipe during each set period, and means for activating said time switch at time spaced in proportion to the rate of movement of said apparatus over the soil and spaced by intervals at least as great as said pre-determined time, the length of said period being unaffected by said activating means whereby the ammonia flows intermittently from said tank to said pipe for periods of time each having a duration unaffected by said activating means.

The present invention is also a method for delivering anhydrous ammonia to the soil so as to provide substantially uniform treatment of the soil which method comprises moving over the soil a conduit from which the ammonia issues to the soil, and each time that said conduit moves at pre-determined distance over said soil, supplying said ammonia to said conduit for a set, pre-determined interval of time which is independent of a rate of movement of said conduit over the soil but which is less than the time required for said conduit to move said pre-determined distance.

On receiving from the means for activating said time switch a signal which may be of an electrical, mechanical or pneumatic nature the time switch will open the valve for the period of time allowed by the time switch as this period will be set to correspond with the quantity of ammonia required which will of course be dependent on the flow rate. In order to allow the metering device to operate over a wide range of flow rates for a given time switch setting the conduit or delivery pipe is preferably provided with means for controlling the rate of fluid flow through the conduit e.g. an orifice meter. It will be understood that the valve for controlling the rate of fluid flow through the conduit, which may be termed a fluid-flow control valve, will control the rate at which fluid flows through the pipe when the time switch operated valve is open. More accurate metering is achieved if the fluid-flow control valve is as close to the time switch operated valve as possible.

The time switch is preferably an electrically actuated time switch and may comprise a solid state timing unit. The time switch may be arranged to accept any electrical, mechanical or pneumatic signal from the process by means of a micro-switch which will receive the signal and then actuate the timing unit which in turn is arranged to open the valve for a set period of time. The valve may conveniently be an electrically operated valve e.g. a solenoid valve. The output from the timing unit may directly open the valve or it may be opened via a relay or an electrical pneumatic converter or other suitable control equipment. When the set time period has elapsed the valve will close and the time switch will be ready to receive a further process signal.

A signal to activate the time switch may be obtained from a land wheel attached to the applicator wheel or from a wheel of the applicator itself, the number of signals obtained being directly proportional to the land covered. The fluid has to be applied to the land at a fixed dose rate and as each signal is received by the time unit it opens the valve for a fixed period of time and permits delivery of a fixed dose of fluid. If the signal is received for example every second then a fixed dose of fluid will be delivered every second. Now since it is virtually impossible to drive or draw an applicator vehicle at a constant speed the signal frequency received tends to vary according to the variations in vehicle speed. Inspite of this variable frequency the device according to the present invention can be arranged still to deliver the desired dose rate; this is achieved by arranging the time switch to open the valve for a proportion of the time available between each signal, for example between 40 and 90 percent preferably between 50 and 75 percent of the time available. In a particular example if a signal is being generated at intervals of 1 second the time switch can be set to open the valve for 0.65 seconds to deliver the required dose, the "dead time" being 0.35 seconds. If then the applicator vehicle increases in speed, the signal frequency generated will increase, the number of signals received in a given time period will increase the accordingly doses will be delivered more frequently, i.e., at intervals of less than one second. The resulting effect is that while the delivery time of 0.65 seconds per dose remains the same the "dead time" of 0.35 seconds is decreased. If on the other hand the applicator vehicle decreases in speed the resulting effect will be that the time interval between each dose delivery will be greater than 1 second or the "dead time" will be greater than 0.35 seconds. It will be understood that the actual proportion of available time employed as dose delivery time will be dependent on the variation in signal frequency experienced. In this way, the device will deliver the required dose rate calculated for a theoretical constant speed of the vehicle despite the variations within certain limits of the vehicle speed in practice. Of course many time switches require a definite period of time in which to re-set and this resetting time must always be allowed for in these calculations.

The invention will be further described with reference to the accompanying drawings in which is shown in diagrammatic form an agricultural fluid applicator employing the metering device according to the invention.

Referring to the diagram of supply tank 1 containing anhydrous liquid ammonia is mounted on a tractor (not shown) and connected by means of a conduit 2 provided with a supply port 3 and a delivery port 4 to a series of liquid delivery pipes 5 mounted on a tractor tool bar (not shown). In the conduit 2 is a variable orifice meter 6 and a solenoid valve 7. The solenoid valve 7 is connected to a solid state timing unit 8 with a variable time setting from 0.2 to 2 seconds (the re-setting time being 0.2 seconds) and a micro-switch 9. The micro-switch 9 received signals from a land wheel 10 either directly by means of a cam 10a attached to the land wheel and the mechanical linkage 10b or via a cable drive of the type used in speedometers. If desired a back pressure control valve may be inserted adjacent to the solenoid valve 7 to achieve more accurate control of and a faster response from the valve 7. An on/off valve 11 is also provided in the conduit 2 adjacent the tank 1.

In operation an approximate speed of application is estimated and the signal frequency generated at this speed calculated. The time unit 8 is set so that the valve 6 is open for 65 percent of the time available between each signal and the fluid-flow rate is set by adjustment of the orifice meter 6 to give the dose rate required over the full distance travelled. When application starts and if the tractor speed remains constant the valve 7 is open for 65 percent of the time and delivers the desired quantity of ammonia at the desired rate. If the speed increases to say 20 percent higher than predicted, then signals are received 20 percent more frequently and as for each signal the delivery time is fixed the valve opens 20 percent more frequently, i.e., it is open for 78 percent of the operating time. If the tractor goes 20 percent slower fewer signals are received and the valve 7 opens 20 percent less frequently, i.e. it is only open 52 percent of the time, but still delivers the correct quantity relative to the ground covered.

In a particular example the estimated application rate is 4 miles per hour and the frequency of signal is 1 second. At 4 miles per hour a fixed quantity of ammonia will be delivered to the fluid delivery port 4 in 0.65 seconds and there will be 0.35 seconds "dead time;" at 4.8 miles per hour a signal will be received every 0.8 seconds, the valve 7 will open for 0.65 seconds leaving a "dead time" of 0.15 seconds. Similarly, at 3.2 miles per hour a signal will be received every 1.2 seconds leaving a "dead time" of 0.55 seconds. That is to say for each signal received, which represents a given distance of land travelled by the applicator, there will be a fixed quantity of ammonia delivered, subject only to the provision that the "dead time" is long enough for the time unit 8 to reset. This system therefore has all the advantages of a metering pump at a lower cost and with greater inherent reliability.

It will be noted that the system produced an intermittent flow but the capacity of the applicator equipment is usually such as to result in substantially uniform delivery at the delivery points 5. With metering pumps which are used in the application of anhydrous liquid ammonia to the soil only 48 percent of the operating time is delivery time, so that the present system is likely to give less pulsations than metering pump systems. The system has the advantage of stopping the flow when the tractor stops and by means of a simple dashboard switch (not shown) the operation may be closed down completely.

With metering pump systems which are operated by a land wheel drive there is a tendency for the land wheel to slip on the land and also to accumulate mud and other trash. The present device while using a land wheel to generate a series of signals is not dependent on the land wheel for power and accordingly the land wheel has little tendency to slip or accumulate mud.

I claim:

1. In ammonia injection apparatus having a delivery pipe for injecting ammonia into the soil as the apparatus is moved over the soil and having a supply tank for supplying the ammonia, the combination therewith of a valve for controlling the flow of ammonia from said tank to said pipe, means connecting said valve at one side thereof to said tank for supplying ammonia to said valve, means connecting said valve at the other side thereof to said delivery pipe for supplying ammonia from said valve to said delivery pipe, timing means connected to said valve for controlling the opening and closing of said valve, said timing means having an activating input, a timing unit connected to said input and activatable by said input, said unit operating, after activation, for a predetermined time period which is independent of said input, and a control output connected to said unit and to said valve for closing said valve at the end of said time period whereby said timing means, when activated, opens said valve for a set, predetermined period of time and then closes said valve at the end of said period, thereby permitting a fixed predetermined quantity of ammonia to flow from said tank to said pipe during each said period, and means connected to said activating input for activating said timing unit at times spaced in proportion to the rate of movement of said apparatus over the soil and spaced by intervals at least as great as said predetermined period of time, the length of said period being unaffected by said activating means whereby the ammonia flows intermittently from said tank to said pipe for periods of time each of which has a duration unaffected by said activating means.

2. Apparatus as set forth in claim 1, wherein said means connecting said valve to said tank comprises means for restricting the flow of said ammonia from said tank through said valve.

3. Apparatus as set forth in claim 1, wherein said timing unit is an electrically operable timing unit and said control output is a switch operable by said timing unit and wherein said valve is a solenoid valve having its solenoid connected to and energizable by said switch.

4. Apparatus as set forth in claim 3, wherein said means connected to said activating input for activating said timing unit includes a further switch which is intermittently operable in accordance with movement of said apparatus over the soil.

5. A method for delivering anhydrous ammonia to the soil so as to provide substantially uniform treatment of the soil which method comprises moving over the soil a conduit from which the ammonia issues to the soil, and each time that said conduit moves a pre-determined distance over said soil, supplying said ammonia to said conduit for a set, pre-determined interval of time which is independent of the rate of movement of said conduit over the soil but which is less than the time required for said conduit to move said pre-determined distance.

* * * * *